Nov. 10, 1936.  F. LÜTTGE  2,060,230
RECOVERY OF PHENOLS FROM AQUEOUS LIQUORS
Filed Feb. 18, 1936
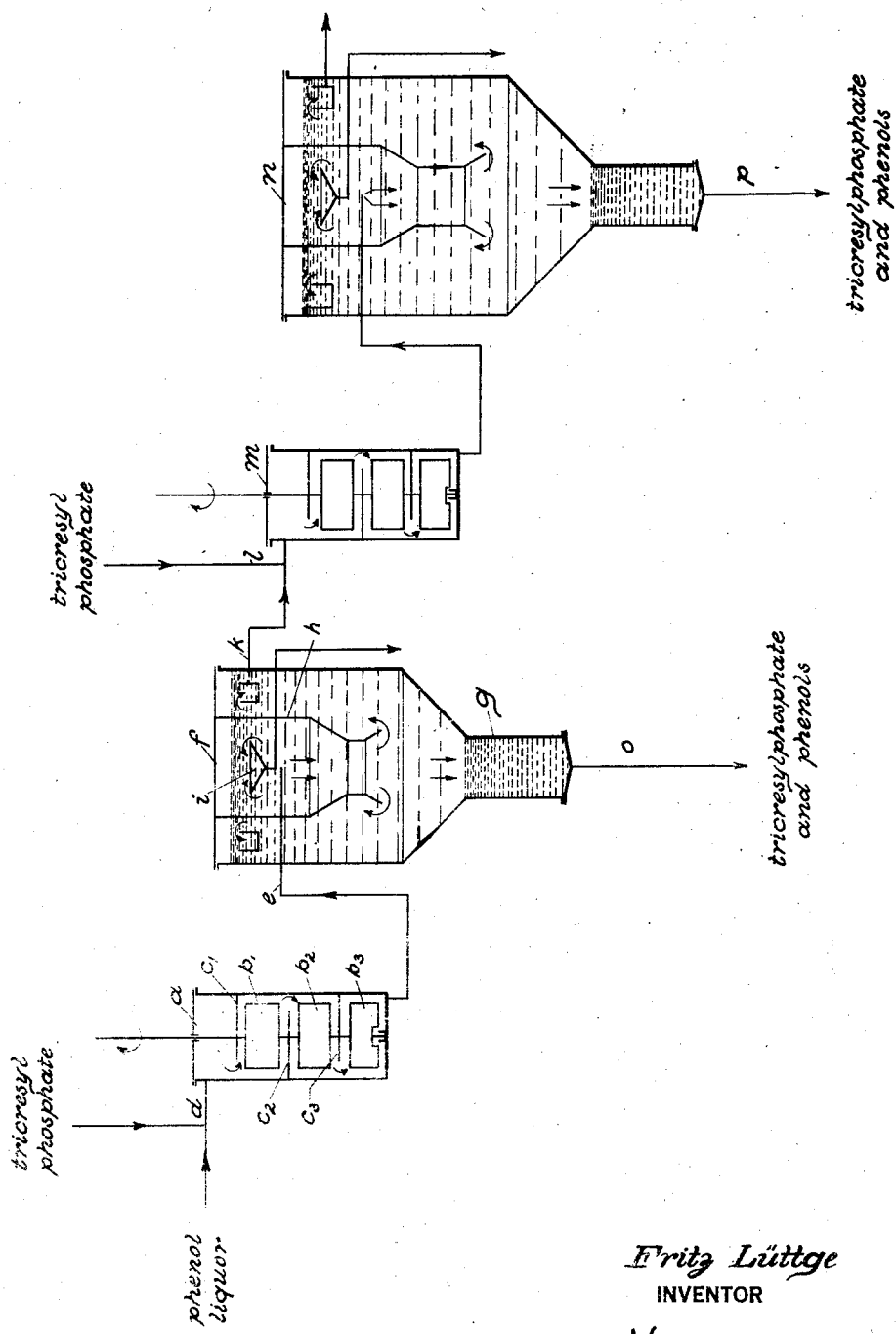
Fritz Lüttge
INVENTOR
BY
ATTORNEYS Patented Nov. 10, 1936

2,060,230

UNITED STATES PATENT OFFICE 2,060,230

RECOVERY OF PHENOLS FROM AQUEOUS LIQUORS

Fritz Lüttge, Leuna, Germany, assignor to I. G. Farbenindustrie Aktiengesellschaft, Frankfort-on-the-Main, Germany Application February 18, 1936, Serial No. 64,485
In Germany February 26, 1935

3 Claims. (Cl. 260—154)

This invention refers to the recovery of phenols from aqueous liquors containing the same.

It has already been proposed to free from their phenol content waste aqueous liquors containing phenols, as for example gas waters from coke ovens or low temperature carbonization plant, by washing with water-insoluble liquid phosphoric acid esters of the general formula:

wherein $X_1$, $X_2$ and $X_3$ each stand for an aryl or alkyl group with more than three carbon atoms and $X_1$, $X_2$ and $X_3$ may denote identical or different radicles, in particular with trialkyl or triaryl phosphates. When dephenolizing waste aqueous liquors containing substances forming emulsions, especially waste aqueous liquors from operations in which brown coal is worked up, there is usually encountered when employing the said process the difficulty that the resulting mixture of phosphate and phenol can only be separated from the waste aqueous liquor with difficulty by reason of the formation of emulsions in consequence of the absorption of water, whereby considerable waste of phosphate results. Furthermore during the distillation of the phenols from the mixture of phosphate and phenols, the absorbed water is also distilled so that an increased consumption of steam results. Since in the regeneration of the phosphates by steam distillation in vacuo, only water is removed together with the phenol, the emulsion-forming substances remaining in the phosphates, the usefulness of the said phosphates decreases after each washing process. During the expelling of the phenols with steam there is a further loss of phosphate because the emulsion-forming substances cause an undesirable formation of foam whereby phosphates are carried over during the distillation.

I have now found that all the said difficulties can be avoided by intimately mixing the waste aqueous liquors containing emulsion-forming substances which are to be dephenolized with the said phosphates in the presence of inert gases with the formation of foam, the phenols being separated in known manner from the mixture of phenols and phosphate separated by sedimentation or like methods.

The mixture of waste aqueous liquor and phosphate saturated with foam obtained in the presence of the inert gas separates very rapidly into three layers when allowed to settle in a clarification vessel. The lowermost layer consists of the phosphate employed together with the absorbed phenols, the central layer consists of the waste aqueous liquor freed from phenols and the uppermost layer consists of the foam which, in addition to a slight amount of phosphate, contains the emulsion-forming substances and may readily be removed.

It is preferred to use tricresyl phosphate as the washing liquid. The inert gases may be for example waste gases from firings, carbon dioxide or nitrogen. The gases may also in some cases be produced from the waste aqueous liquors themselves, as for example by electrolysis or by acidification when working up waste aqueous liquors containing carbonates or sulphides. By appropriate introduction of the gas a good mixing may be effected or at least the mixing may be assisted. The process may be carried out in one or more stages depending on the desired degree of dephenolization.

The nature of the invention will be further described with reference to the accompanying drawing which illustrates an arrangement of apparatus suitable for carrying out the process according to this invention but the invention is not restricted to the particular arrangement shown.

Tricresyl phosphate is used as the washing agent.

A mixture of waste aqueous liquor containing phenols and tricresyl phosphate which is supersaturated with carbon dioxide is introduced at $d$ into a container $a$ provided with a stirrer mechanism. The stirrer mechanism consists of three plate stirrers $b_1$, $b_2$ and $b_3$ between which are arranged guide plates $c_1$, $c_2$ and $c_3$. 10 parts of tricresyl phosphate are employed for each 100 parts of a waste aqueous liquor containing 0.5 per cent of phenols. After the mixture has been treated in $a$, it flows through a pipe $e$ into a clarification vessel $f$. The lower part of the vessel $f$ is conically restricted and provided with a portion $g$ for the reception of tricresyl phosphate laden with phenols which separates, while in the upper cylindrical part of the vessel $f$ there is arranged an inserted tube $h$ in which the foam containing the emulsion-forming substances becomes enriched at $i$. The treated waste aqueous liquor, which still contains 830 milligrams of phenol per litre, flows through a pipe $k$ into a second container $m$ in which it is treated in the manner already described with 5 parts of tricresyl phosphate which is introduced through the pipe $l$. It then passes into a clarification vessel $n$ which it leaves with a phenol content of 350 milligrams per litre. The tricresyl phosphate laden with phenols is withdrawn through pipes $o$ and $p$, freed from phenol and water by treatment with steam and then used again. The layer of foam containing the emulsion-forming substances and which contains about 0.05 per cent of the tricresyl phosphate employed may be removed periodically or continuously.

When working up waste aqueous liquors containing phenols which contain only slight amounts of foam-forming substances or none at all, only an unsatisfactory formation of foam or none at all can take place so that an absorption of the emulsifying substances in the layer of foam can only take place to an unsatisfactory degree or not at all. In this case it is preferable to add foam-forming substances, for example saponines, mucilages or artificial foam-forming substances such as the alkali metal salts of alkylated aromatic or aliphatic sulphonic acids or of esters of sulphuric acids, for example the sodium salts of propylated or butylated naphthalene sulphonic acids or of oleyl alkyl taurines, preferably to the waste aqueous liquor.

The process according to this invention offers the advantage that the undesirable formation of emulsions while carrying out the dephenolization can be to a great extent avoided, and that the troubles in the working up of the mixture of phenol and phosphate already described no longer occur.

What I claim is:

1. A process for the recovery of phenols from an aqueous liquor containing the same besides emulsion-forming substances comprising intimately mixing said aqueous liquor in the presence of inert gases with a water-insoluble liquid phosphoric acid ester of the general formula:

wherein $X_1$, $X_2$ and $X_3$ each stand for an aryl or alkyl group with more than three carbon atoms and $X_1$, $X_2$ and $X_3$ may denote identical or different radicles, and thus causing the formation of foam, allowing the mixture to separate into different layers by sedimentation and drawing off the liquid phosphate laden with phenol.

2. A process for the recovery of phenols from an aqueous liquor containing the same besides emulsion-forming substances comprising intimately mixing said aqueous liquor in the presence of inert gases with tricresyl phosphate and thus causing the formation of foam, allowing the mixture to separate into different layers by sedimentation and drawing off the liquid phosphate laden with phenol.

3. In a process as claimed in claim 1 assisting the foam-formation by adding foam-forming substances.

FRITZ LÜTTGE.